United States Patent
Ye et al.

(10) Patent No.: US 12,553,320 B2
(45) Date of Patent: Feb. 17, 2026

(54) AUTO-ENGAGEABLE COUPLING FOR PREVENTING TRANSMISSION OF REVERSE ROTATION TO ESP MOTORS

(71) Applicant: Baker Hughes Oilfield Operations LLC, Houston, TX (US)

(72) Inventors: Zheng Ye, Claremore, OK (US); David Tanner, Broken Arrow, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 335 days.

(21) Appl. No.: 17/903,276

(22) Filed: Sep. 6, 2022

(65) Prior Publication Data
US 2023/0070148 A1    Mar. 9, 2023

Related U.S. Application Data

(60) Provisional application No. 63/240,755, filed on Sep. 3, 2021.

(51) Int. Cl.
*E21B 43/12* (2006.01)
*F04B 47/06* (2006.01)
(Continued)

(52) U.S. Cl.
CPC ............ *E21B 43/128* (2013.01); *F04B 47/06* (2013.01); *F04D 13/086* (2013.01); *F04D 13/10* (2013.01);
(Continued)

(58) Field of Classification Search
CPC ...... E21B 43/128; F04B 47/06; F04D 13/086; F04D 13/10; F16D 41/061; F16D 41/07; F16D 67/02; F16D 43/202–2026
See application file for complete search history.

(56) References Cited

U.S. PATENT DOCUMENTS 1,849,212 A * 3/1932 Winther .................. F16D 41/22
                                                                      192/46
1,900,787 A    3/1933   Justin
(Continued)

FOREIGN PATENT DOCUMENTS

EP          0153079 A1    8/1985
GB          2549751 A     11/2017
(Continued)

OTHER PUBLICATIONS

ISR/US; Search Report and Written Opinion; PCT/US2022/042629; Feb. 14, 2023.

*Primary Examiner* — Christopher S Bobish
(74) *Attorney, Agent, or Firm* — Baker Hughes Company (57) ABSTRACT

An auto-engageable coupling is disclosed for use in a pumping system that includes an electric motor and a pump driven by the electric motor. The auto-engageable coupling permits the transfer of torque from the motor to the pump, but prevents the pump from applying torque to the motor. In some embodiments, the auto-engageable coupling includes a drive plate connected to a motor shaft and a reaction plate connected to an output shaft. The drive plate and reaction plate are only coupled together to transmit torque from the motor to the pump when the motor is activated and rotating in a first, intended direction. When the motor is not activated and the pump is forced to rotate in a first direction, the drive plate and the reaction plate are disengaged to prevent the delivery of torque from the pump to the motor.

12 Claims, 10 Drawing Sheets

(51) Int. Cl.
*F04D 13/08* (2006.01)
*F04D 13/10* (2006.01)
*F16D 41/061* (2006.01)
*F16D 41/07* (2006.01)
*F16D 43/202* (2006.01)
*F16D 67/02* (2006.01)

(52) U.S. Cl.
CPC .......... *F16D 41/061* (2013.01); *F16D 41/07* (2013.01); *F16D 43/202* (2013.01); *F16D 67/02* (2013.01); *F16D 43/2024* (2013.01)

(56) References Cited

U.S. PATENT DOCUMENTS

| | | | | |
|---|---|---|---|---|
| 2,834,443 | A * | 5/1958 | Olchawa | F16B 1/04 192/223.3 |
| 3,252,553 | A * | 5/1966 | Peterson | F16D 43/216 192/53.32 |
| 3,433,337 | A * | 3/1969 | Salter | F16D 41/22 192/112 |
| 3,550,727 | A * | 12/1970 | Mccain | F04D 13/022 192/223.1 |
| 3,572,482 | A * | 3/1971 | Kalpas | F16D 67/02 192/223.1 |
| 3,802,803 | A | 4/1974 | Bogdanov et al. | |
| 3,918,559 | A * | 11/1975 | Rousset | F16D 13/38 188/106 R |
| 3,918,830 | A | 11/1975 | Schneider | |
| 4,162,000 | A * | 7/1979 | Zlotek | F16D 41/07 192/41 A |
| 4,262,786 | A * | 4/1981 | Taylor | F16D 41/12 192/48.92 |
| 4,330,740 | A | 5/1982 | Shell et al. | |
| 4,410,845 | A | 10/1983 | Lockyear | |
| 4,676,352 | A * | 6/1987 | Randolph | F16H 3/145 192/148 |
| 4,797,075 | A * | 1/1989 | Edwards | E21B 43/121 188/185 |
| 5,198,734 | A | 3/1993 | Johnson | |
| 5,350,242 | A * | 9/1994 | Wenzel | E21B 4/003 384/97 |
| 5,568,849 | A * | 10/1996 | Sasaki | B25B 23/0064 81/429 |
| 5,901,817 | A * | 5/1999 | Gitnes | F16D 63/006 188/134 |
| 6,079,489 | A * | 6/2000 | Hult | F16D 59/00 166/78.1 |
| 6,113,355 | A | 9/2000 | Hult et al. | |
| 6,264,431 | B1 | 7/2001 | Triezenberg | |
| 6,325,143 | B1 | 12/2001 | Scarsdale | |
| 6,369,534 | B1 | 4/2002 | Menegoli | |
| 6,388,353 | B1 | 5/2002 | Liu et al. | |
| 6,454,000 | B1 | 9/2002 | Zupanick | |
| 6,598,681 | B1 | 7/2003 | Berry | |
| 6,798,338 | B1 | 9/2004 | Layton | |
| 6,877,594 | B2 * | 4/2005 | Kuivamaki | F16D 67/02 188/189 |
| 6,940,249 | B2 | 9/2005 | Toyoda | |
| 6,974,015 | B2 * | 12/2005 | Gamache | F16D 67/02 188/134 |
| 7,170,262 | B2 | 1/2007 | Pettigrew | |
| 7,202,619 | B1 | 4/2007 | Fisher | |
| 7,330,779 | B2 | 2/2008 | Schulz | |
| 7,479,756 | B2 | 1/2009 | Kasunich et al. | |
| 7,971,650 | B2 | 7/2011 | Yuratich et al. | |
| 8,334,666 | B2 | 12/2012 | Plitt et al. | |
| 8,456,116 | B2 | 6/2013 | Burdick | |
| 8,624,530 | B2 | 1/2014 | Chung et al. | |
| 9,027,717 | B2 * | 5/2015 | Hult | F16D 65/22 188/327 |
| 9,054,615 | B2 | 6/2015 | Head et al. | |
| 9,057,256 | B2 | 6/2015 | Ige et al. | |
| 9,061,751 | B2 * | 6/2015 | Tanaka | B63H 23/30 |
| 9,255,632 | B2 * | 2/2016 | Finney | F16D 67/02 |
| 9,334,908 | B2 * | 5/2016 | Tickner | F16D 51/22 |
| 9,595,903 | B2 | 3/2017 | Hawes et al. | |
| 9,739,319 | B2 | 8/2017 | Aramoto et al. | |
| 9,777,540 | B2 | 10/2017 | Downie et al. | |
| 9,890,622 | B2 * | 2/2018 | Morrison | F04B 47/02 |
| 9,903,373 | B2 | 2/2018 | Hawes et al. | |
| 10,240,644 | B2 * | 3/2019 | Li | F16D 13/40 |
| 10,411,557 | B2 * | 9/2019 | Hashish | H02K 7/116 |
| 10,655,691 | B2 | 5/2020 | Wano | |
| 10,903,715 | B2 | 1/2021 | Chelaidite et al. | |
| 11,067,138 | B2 * | 7/2021 | Leonov | F16D 41/185 |
| 11,421,463 | B2 * | 8/2022 | Pandian | B64D 29/06 |
| 11,773,703 | B2 * | 10/2023 | Ejim | H02K 5/132 310/87 |
| 2002/0056602 | A1 | 5/2002 | Aurora | |
| 2003/0085091 | A1 | 5/2003 | Ichihara et al. | |
| 2004/0262043 | A1 | 12/2004 | Schuaf | |
| 2006/0021841 | A1 | 2/2006 | Kimes et al. | |
| 2006/0185957 | A1 | 8/2006 | Kimes et al. | |
| 2007/0110593 | A1 | 5/2007 | Sheth et al. | |
| 2008/0078647 | A1 | 4/2008 | Watanabe et al. | |
| 2008/0179156 | A1 | 7/2008 | Byun | |
| 2008/0187444 | A1 | 8/2008 | Molotkov et al. | |
| 2009/0291001 | A1 | 11/2009 | Neuroth et al. | |
| 2010/0150751 | A1 | 6/2010 | Merrill et al. | |
| 2011/0033314 | A1 | 2/2011 | Plitt et al. | |
| 2011/0171047 | A1 | 7/2011 | Parmeter et al. | |
| 2013/0101447 | A1 | 4/2013 | Brown et al. | |
| 2013/0235494 | A1 | 9/2013 | Holce et al. | |
| 2013/0312559 | A1 | 11/2013 | Tanaka et al. | |
| 2013/0343933 | A1 | 12/2013 | Brown et al. | |
| 2014/0102721 | A1 | 4/2014 | Bespalov et al. | |
| 2014/0368143 | A1 | 12/2014 | Breitzmann et al. | |
| 2015/0114662 | A1 | 4/2015 | Hendryx | |
| 2015/0167657 | A1 | 6/2015 | Van Dam et al. | |
| 2015/0275581 | A1 | 10/2015 | Agarwal et al. | |
| 2015/0285319 | A1 | 10/2015 | Kawai et al. | |
| 2016/0123098 | A1 | 5/2016 | Marr | |
| 2016/0186731 | A1 | 6/2016 | Meyer et al. | |
| 2017/0194831 | A1 | 7/2017 | Marvel et al. | |
| 2017/0306731 | A1 | 10/2017 | Xiao et al. | |
| 2018/0094512 | A1 | 4/2018 | Sadilek et al. | |
| 2018/0097466 | A1 | 4/2018 | Huh et al. | |
| 2018/0316240 | A1 | 11/2018 | Chelaidite et al. | |
| 2019/0323568 | A1 | 10/2019 | Uppal et al. | |
| 2020/0063541 | A1 * | 2/2020 | Davis | E21B 43/128 |
| 2020/0116154 | A1 | 4/2020 | Lu et al. | |
| 2020/0166088 | A1 * | 5/2020 | Leonov | F16D 41/064 |
| 2021/0095674 | A1 | 4/2021 | Lu et al. | |

FOREIGN PATENT DOCUMENTS

| | | |
|---|---|---|
| JP | 2012162995 A | 8/2012 |
| KR | 20060001231 A | 1/2006 |
| KR | 100586150 B1 | 6/2006 |
| KR | 101580526 B1 | 12/2015 |
| RU | 2546685 C2 | 4/2015 |
| WO | 2010030272 A1 | 3/2010 |
| WO | 2014209127 A1 | 12/2014 |

* cited by examiner

AUTO-ENGAGEABLE COUPLING FOR PREVENTING TRANSMISSION OF REVERSE ROTATION TO ESP MOTORS

RELATED APPLICATIONS

This application claims the benefit of U.S. Provisional Patent Application Ser. No. 63/240,755 filed Sep. 3, 2021, entitled "Auto-Engageable Coupling for Preventing Transmission of Reverse Rotation to ESP Motors," the disclosure of which is incorporated by reference as if fully set forth herein.

FIELD OF THE INVENTION

The subject matter disclosed herein relates to electric motors, and more specifically to electric motors for use in connection with electric submersible pumps (ESPs) in oil and gas applications.

BACKGROUND

Oil is typically produced by drilling wells into oil reservoirs in geological formations and then pumping the oil out of the reservoirs through the wells. Commonly, the oil is produced using ESPs that are deployed in the wells. Electric power suitable for the respective ESPs is normally generated by electric drive systems that are positioned at the surface of each well, and is conveyed from the drive to the ESP via a power cable that extends from the drive system to the deployed ESP.

An ESP typically includes a pump section, a seal section, and a motor section. The power from the electric drive system is provided to the motor, which drives the pump section. Frequently, the motor is a rotary motor which drives a shaft that is coupled to the shaft of a centrifugal pump. The rotating motor shaft causes the pump shaft to rotate, generating fluid pressure that forces fluid out of the well.

The motor is typically one of two types: an induction motor; or a permanent magnet motor. In the case of an induction motor, power (usually three-phase AC power) is provided to the windings of the motor's stator, causing the stator to generate rotating magnetic fields in the stator. These rotating magnetic fields induce currents and corresponding magnetic fields in a rotor, causing the rotor and the motor shaft to rotate and drive the pump. In the case of a permanent magnet motor, three-phase AC power is provided to the motor's stator windings, generating rotating magnetic fields as in the induction motor. The rotor of the permanent magnet motor, however, has a set of permanent magnets which cause the rotor to rotate in the rotating magnetic fields generated by the stator.

As explained above, in normal operation, power supplied to a conventional permanent magnet ESP motor causes the motor to rotate, which causes fluid (e.g., oil) to flow through the pump. What is less frequently considered, however, is that the reverse of this sequence may also be true. In other words, the motor can act as a generator. If fluid is caused to flow through the pump, this may cause the pump to rotate, which will in turn cause the motor to rotate and generate an AC voltage which is applied to the conductors of the power cable. The generated voltage is often unexpected since the motor normally consumes electrical energy, and it may be dangerous or even fatal to persons working on the system. It would therefore be desirable to provide means to protect these people from the electric potential that may be generated by an ESP motor acting as a generator.

SUMMARY OF THE INVENTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, the present disclosure is directed to an auto-engageable coupling for use in a pumping system that includes an electric motor, a pump driven by the electric motor and a seal section disposed between the pump and the motor. The auto-engageable coupling permits the transfer of torque from the motor to the pump, but prevents the pump from applying torque to the motor.

In some embodiments, the auto-engageable coupling includes a drive plate connected to a motor shaft and a reaction plate connected to a seal section shaft. The drive plate and reaction plate are only coupled together to transmit torque from the motor to the pump when the motor is activated and rotating in a first direction. When the motor is not activated and the pump is forced to rotate in a second direction, the drive plate and the reaction plate are disengaged to prevent the delivery of torque from the pump to the motor.

In an embodiment, the auto-engageable coupling includes a drive plate connected to a motor shaft driven by the motor and a reaction plate connected to an output shaft. The drive plate and reaction plate permit the transmission of torque from the motor to the pump when the motor is energized for rotation in an intended direction, but prevent the transmission of torque from the pump to the motor when the motor is not energized for rotation. In this embodiment, the auto-engageable coupling also includes a braking mechanism that is configured to resist the rotation of the output shaft in an unintended direction.

In another embodiment, the present disclosure is directed to an auto-engageable coupling for use in connection with a submersible pumping system that includes a pump and a motor. In this embodiment, the auto-engageable coupling include a drive cup connected to a motor shaft driven by the motor, an output cup connected to an output shaft, and a drive bearing clutch connected between the drive cup and the output cup. The drive bearing clutch is configured to lock the drive cup and the output cup together when the motor shaft is driven in an intended direction. The auto-engageable coupling further includes a brake bearing clutch configured to resist the rotation of the output shaft in an unintended direction.

In yet another embodiment, the present disclosure is directed to a submersible pumping system that has a motor, a motor shaft that transfers torque from the motor, and a pump driven by the motor. The pump is connected directly or indirectly to an output shaft. The pumping system also includes an auto-engageable coupling connected between the motor shaft and the output shaft. The auto-engageable coupling has a drive plate connected to the motor shaft and a reaction plate connected to the output shaft. The drive plate and reaction plate permit the transmission of torque from the motor to the pump when the motor is energized for rotation in an intended direction.

BRIEF DESCRIPTIONS OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Figure 1:
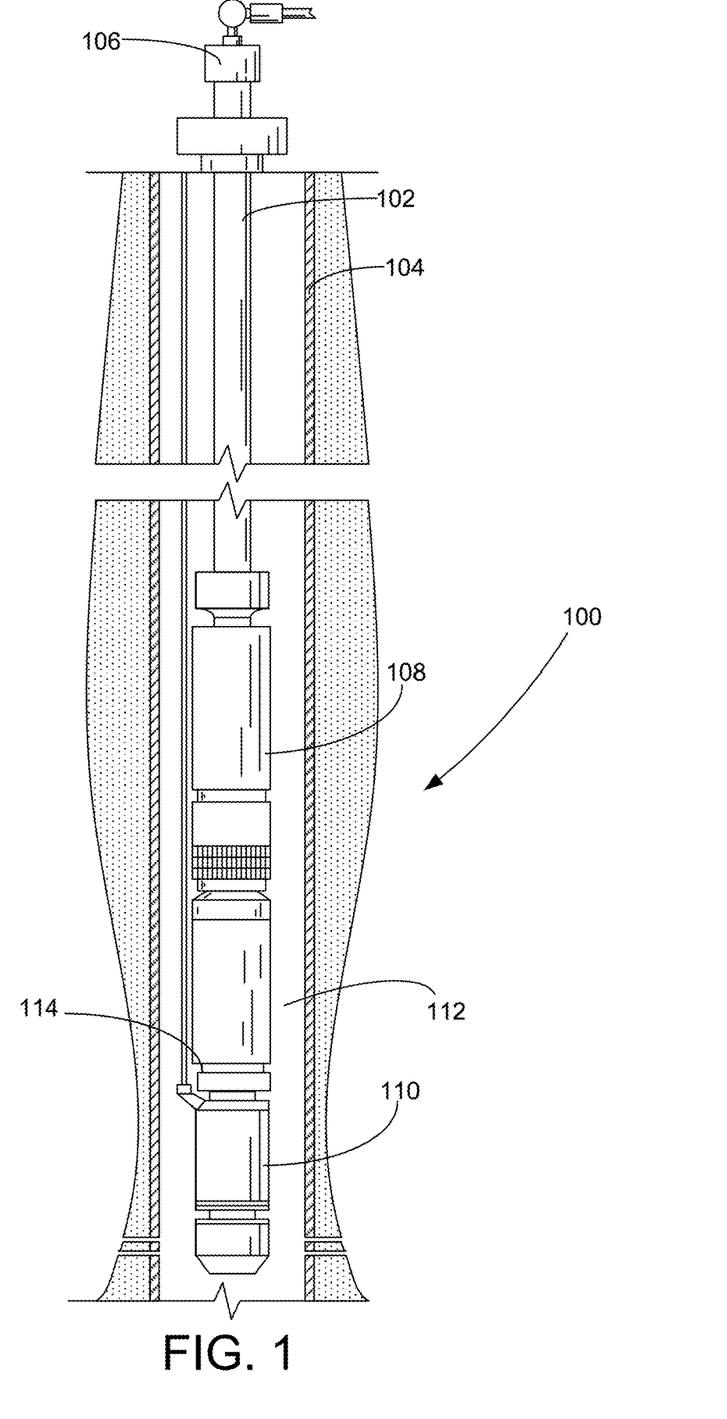
FIG. 1 presents an overview of a submersible pumping system deployed in well.

In accordance with an embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 includes some combination of a pump 108, a motor 110 and a seal section 112. The motor 110 is an electrical motor that receives power from a surface-mounted motor control unit (not shown). In exemplary embodiments, the motor 110 is a permanent magnet motor. When energized, the motor 110 drives a shaft that causes the pump 108 to operate. The seal section 112 shields the motor 110 from mechanical thrust produced by the pump 108 and provides for the expansion of motor lubricants during operation. The seal section 112 also isolates the motor 110 from the wellbore fluids. The seal section 112 includes a housing (not separately designated) configured to protect the internal components of the seal section 112 from the exterior wellbore environment. It may be desirable to use tandem-motor combinations, multiple seal sections, multiple pump assemblies or other downhole components not shown in FIG. 1.

The pumping system 100 includes an auto-engageable coupling 114 between the motor 110 and the seal section 112. Generally, the auto-engageable coupling 114 facilitates the intended transmission of torque from the motor 110 to the seal section 112 and pump 108, while preventing the unintentional transmission of torque from the pump 108 to the motor 110. This mitigates the risk of creating a fugitive back-EMF force by turning the motor 110 with torque generated by fluid falling or otherwise passing through the pump 108. The auto-engageable coupling 114 also prevents the transmission of torque from the motor 110 to the pump 108 if the motor 110 rotates in the wrong direction when energized.

Figure 2:
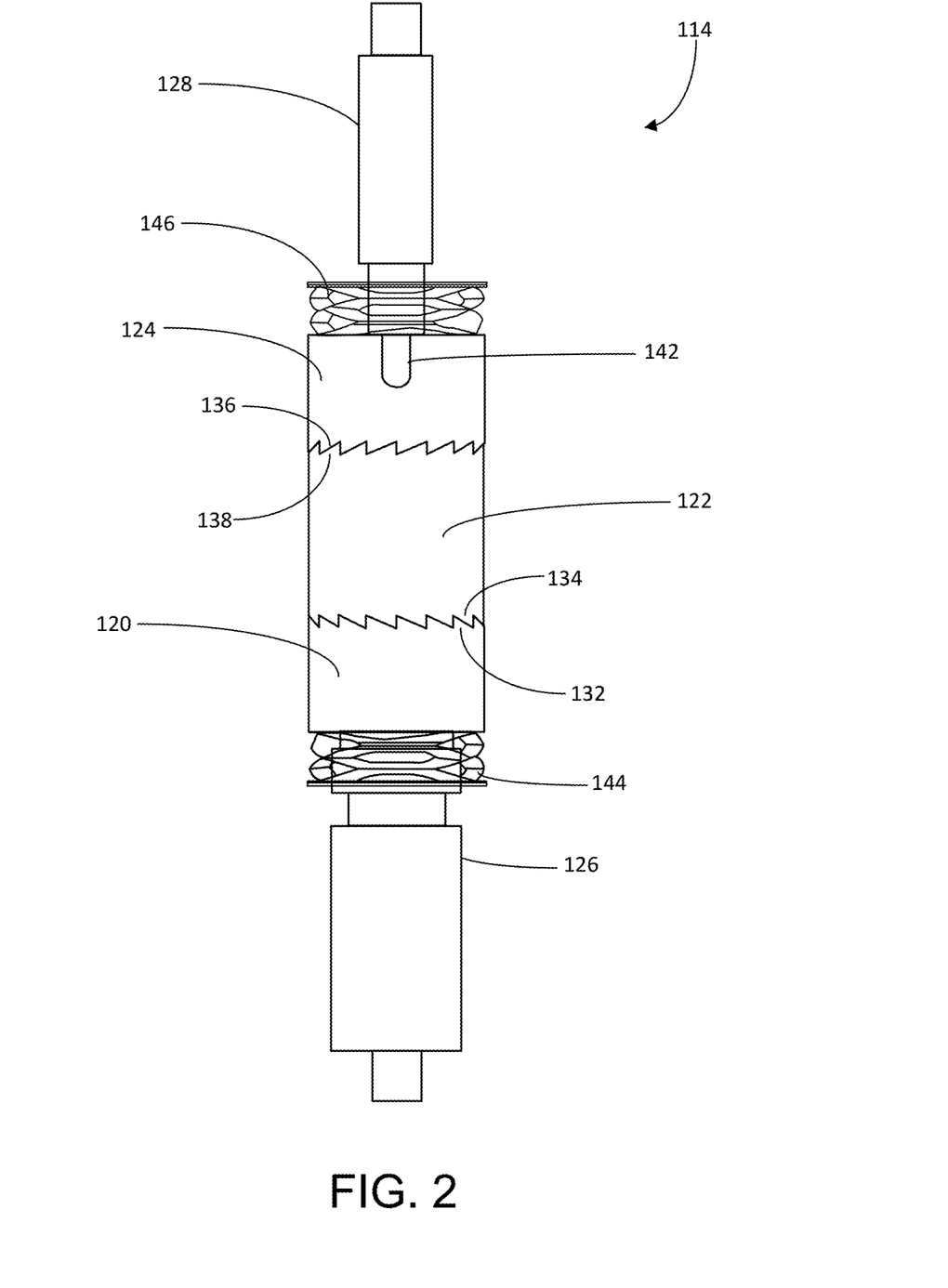
FIG. 2 presents a side view of an auto-engageable coupling constructed in accordance with a first embodiment
Figure 3:
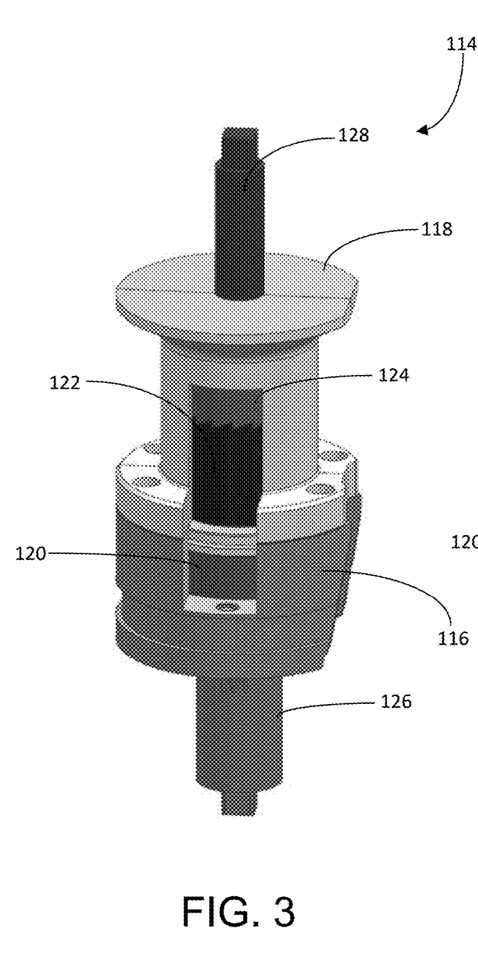
FIG. 3 presents a perspective view of the auto-engageable coupling of FIG. 2 installed within the seal section base and motor head.
Figure 4:
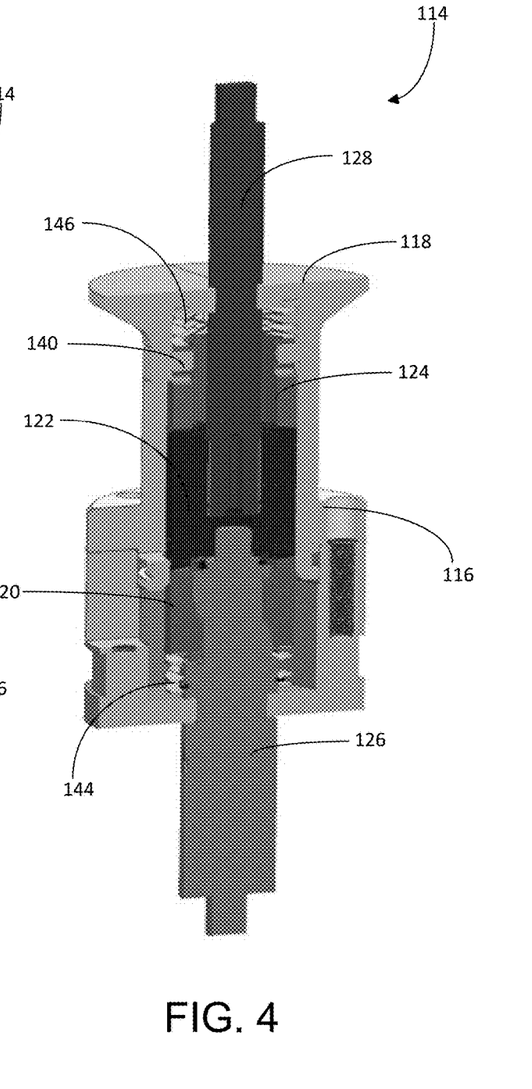
FIG. 4 presents a cross-sectional view of the auto-engageable coupling of FIG. 3.

Turning to FIG. 2, shown therein is an isolated depiction of the auto-engageable coupling 114 constructed in accordance with a first embodiment. It will be appreciated that the auto-engageable coupling 114 is configured to reside inside the pumping system 100 along the driveline between the motor 110 and pump 108. For example, as indicated in FIGS. 3 and 4, a portion of the auto-engageable coupling 114 resides in a head 116 of the motor 110 ("motor head 116") and within a base 118 of the seal section 112 ("seal section base 118").

In the first embodiment, the auto-engageable coupling 114 includes a cylindrical drive plate 120, a cylindrical reaction plate 122, and a cylindrical braking plate 124. The drive plate 120 is connected to a motor shaft 126 (or "input shaft") that is in turn connected to the rotor of the motor 110. The drive plate 120 is configured to rotate with the motor shaft 126. The reaction plate 122 is connected to, and configured for rotation with, an output shaft 128. In some embodiments, the output shaft 128 is a seal section shaft extending through the seal section 112. In other embodiments, the output shaft 128 is a pump shaft that extends into the pump 108. In each case, the output shaft 128 is connected directly or indirectly to the rotational components (e.g., impellers or rotors) of the pump 108.

The drive plate 120 includes drive plate teeth 132 that are configured to engage with reaction plate lower teeth 134 under certain conditions, while allowing the drive plate 120 and reaction plate 122 to rotate with respect to one another under different conditions. Similarly, the braking plate 124 includes braking plate teeth 136 that are configured to engage with reaction plate upper teeth 138 under certain conditions, while allowing the braking plate 124 and reaction plate 122 to rotate with respect to one another under different conditions.

In the present embodiment, the drive plate teeth 132, reaction plate lower teeth 134, braking plate teeth 136, and reaction plate upper teeth 138 are configured as asymmetrical, unidirectional teeth. The drive plate teeth 132 and reaction plate lower teeth 134 are each configured to mesh and engage one another in a locked manner when the drive plate 120 is rotated under torque from the motor 110 in a first direction (e.g., clockwise). When the drive plate 120 is rotated in a second direction (e.g., counterclockwise), the shape of the drive plate teeth 132 and reaction plate lower teeth 134 allows movement between the drive plate 120 and the reaction plate 122. Similarly, when the reaction plate 122 is driven in a second direction (e.g., counterclockwise), the reaction plate upper teeth 138 engage and mesh with the braking plate teeth 136. If the reaction plate 122 is rotated in the first direction (e.g., clockwise), the reaction plate upper teeth 138 do not engage with the braking plate teeth 136, thereby allowing the reaction plate 122 to rotate with respect to the stationary braking plate 124.

The output shaft 128 passes through the braking plate 124. The braking plate 124 is prevented from rotation by guide pins 140, which extend from inside the seal section base 118. The guide pins 140 are captured within vertical guide slots 142 in the braking plate 124, which allows the braking plate 124 to be axially displaced within the seal section base 118.

Figure 5:
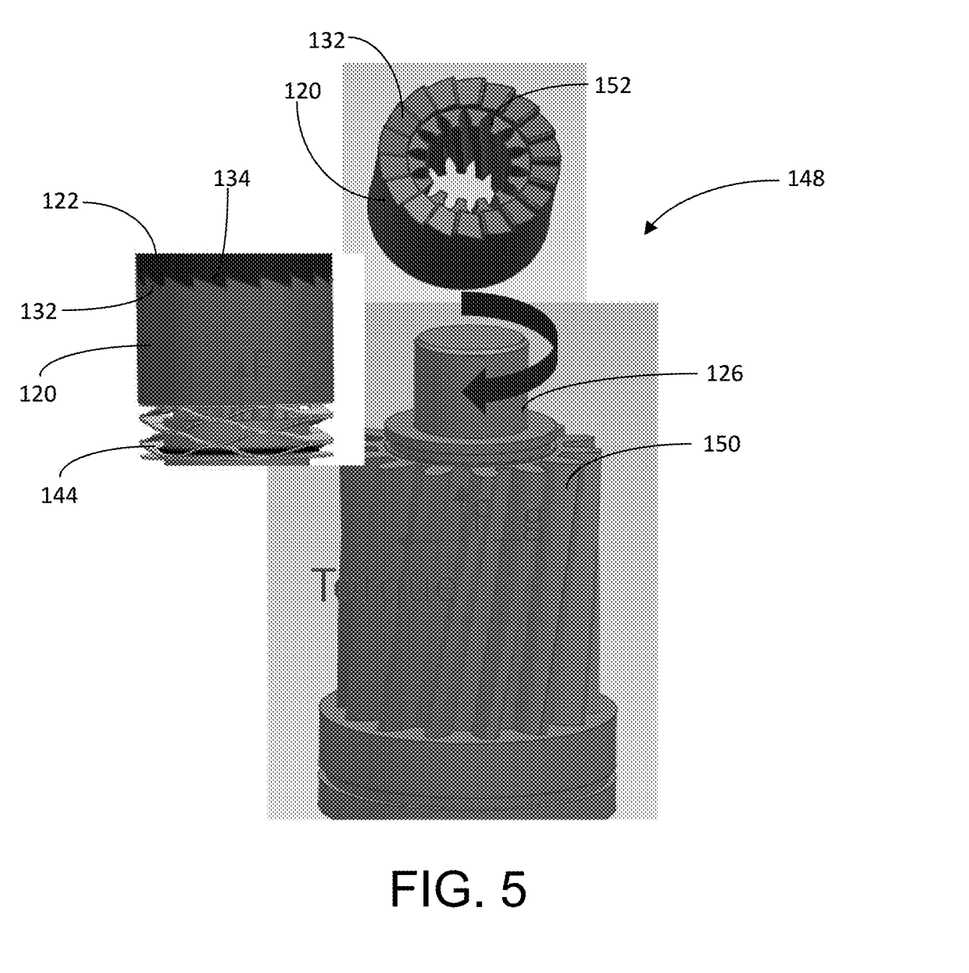
FIG. 5 presents a perspective view of the torque-engagement mechanism in the drive plate of the auto-engageable coupling of FIG. 2.

The drive plate 120 and braking plate 124 are each configured for axial displacement relative to the reaction plate 122. The auto-engageable coupling 114 includes a lower spring 144 that forces the drive plate 120 towards the reaction plate 122. An upper spring 146 above the braking plate 124 forces the braking plate 124 towards the reaction plate 122. Additionally, the drive plate 120 includes a torque displacement mechanism 148 that includes a spiraled gear 150 on the end of the motor shaft 126 that engages with interior slots 152 within the drive plate 120. When the drive plate 120 is rotated in the first direction by the motor shaft 126 under torque from engagement with the reaction plate 122, the drive plate 120 is pushed against the reaction plate 122 by the torque displacement mechanism 148. If the drive plate 120 is not transmitting torque to the reaction plate 122, the drive plate 120 is not axially displaced by the torque displacement mechanism 148.

In exemplary embodiments, the drive plate 120 only fully engages the reaction plate 122 in a normal drive mode when the lower spring 144 and the torque displacement mechanism 148 cooperatively push the drive plate 120 into full engagement with the reaction plate 122. If the torque displacement mechanism 148 is not activated by the realization of torque between the drive plate 120 and the reaction plate 122, the force provided by the lower spring 144 is insufficient to fully engage the drive plate 120 and the reaction plate 122, thereby allowing the reaction plate 122 and drive plate 120 to rotate with respect to one another without the transmission of torque from the motor shaft 126 to the output shaft 128.

Similarly, the upper spring 146 is configured to press the non-rotating braking plate 124 into an approximated position with respect to the reaction plate 122. If the reaction plate 122 rotates in the second (e.g., counterclockwise) direction, the braking plate teeth 136 will engage the reaction plate upper teeth 138 and prevent the reaction plate 122 from rotating. If, on the other hand, the reaction plate 122 is rotating in the first direction (e.g., clockwise), the reaction plate upper teeth 138 will pass under the braking plate teeth 136 with minimal or no contact. It will be appreciated that the motor shaft 126 and output shaft 128 are both held in a fixed axial position by thrust bearings or other containment mechanisms.

Figure 6:
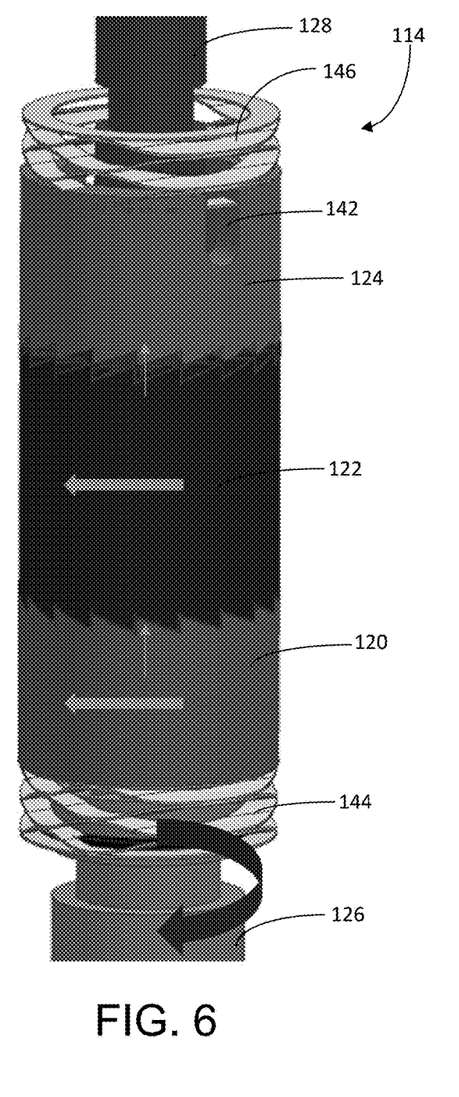
FIG. 6 presents a side view of an auto-engageable coupling constructed in accordance with a first embodiment in a state of normal operation in which the motor drives the pump in a first (clockwise) direction.

Turning to FIG. 6, shown therein is a depiction of the auto-engageable coupling 114 in a first state, which can be characterized as a normal drive mode of operation. The motor 110 is driving the motor shaft 126 in the first direction (e.g., clockwise looking at the motor 110 from the pump 108) and the lower spring 144 and torque displacement mechanism 148 have pushed the drive plate 120 into full engagement with the reaction plate 122. The drive plate 120 and reaction plate 122 are engaged to transmit torque between the motor shaft 126 and the output shaft 128. The clockwise rotation of the reaction plate 122 permits the reaction plate 122 to rotate under the stationary braking plate 124 without engagement between the reaction plate upper teeth 138 and the braking plate teeth 136.

Figure 7:
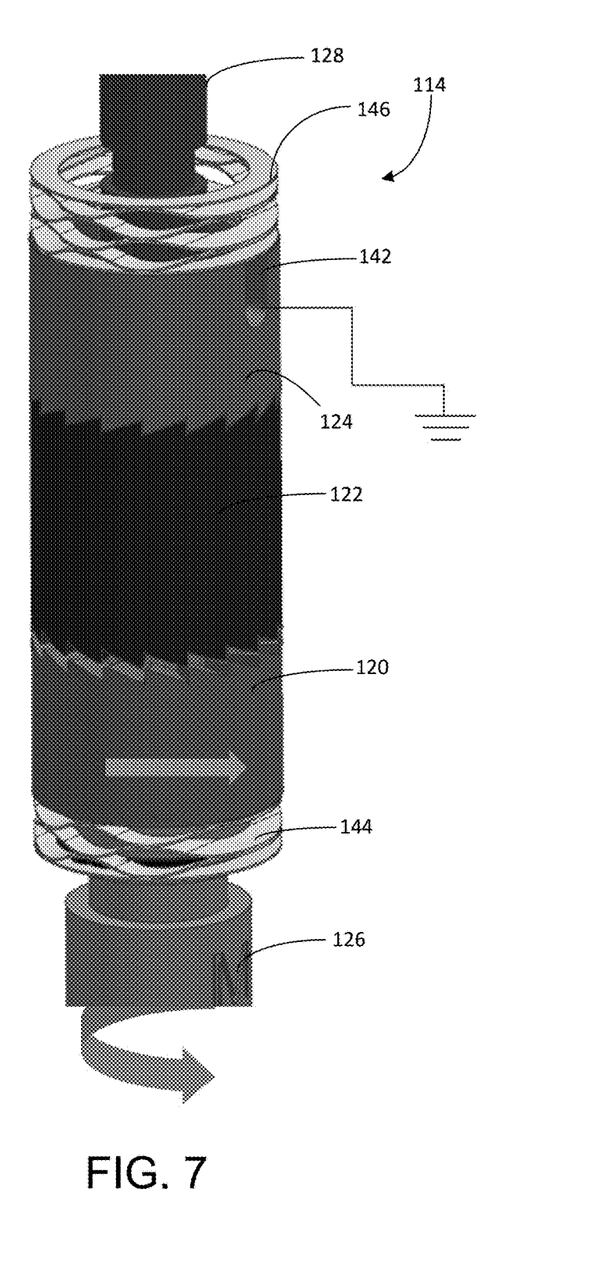
FIG. 7 presents a side view of the auto-engageable coupling of FIG. 2 in a state in which the motor rotates in a second (counterclockwise) direction when energized.

Turning to FIG. 7, shown therein is a depiction of the auto-engageable coupling 114 in a second state. In this second state, the motor 110 has been energized, but is rotating in an unintended second (e.g., counterclockwise) direction. Because the rotation of the drive plate 120 in a counterclockwise direction prohibits engagement with the reaction plate 122, the torque displacement mechanism 148 is not activated to fully deploy the drive plate 120 against the reaction plate 122. In this second mode of operation, the drive plate 120 rotates under the reaction plate 122 which is locked into a stationary position through engagement with the braking plate 124.

Figures 8, 9:
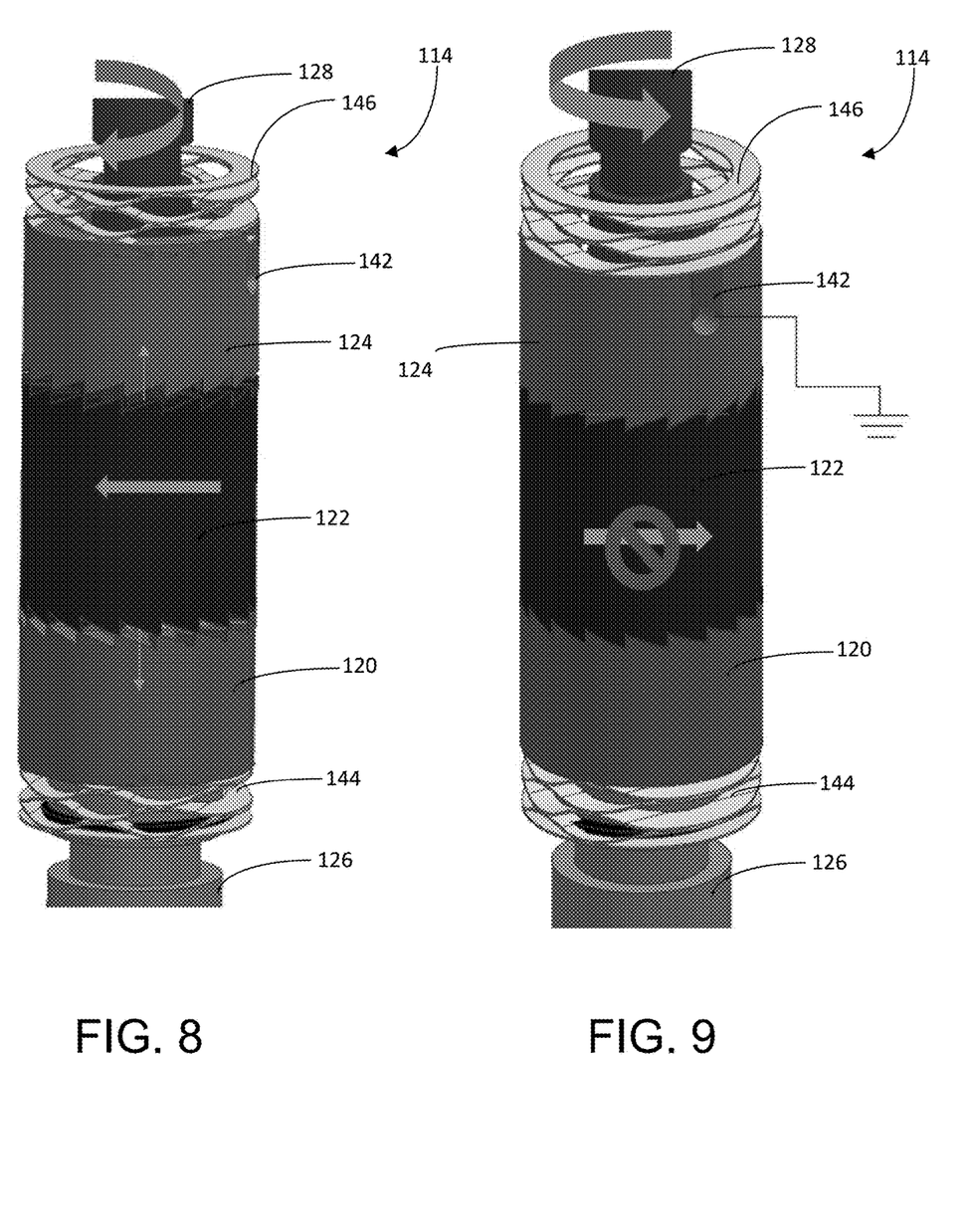
FIG. 8 presents a side view of the auto-engageable coupling of FIG. 2 in a state in which the auto-engageable coupling isolates the motor from an unintentional clockwise rotation induced in the pump.
FIG. 9 presents a side view of the auto-engageable coupling of FIG. 2 in a state in which the auto-engageable coupling arrests the counterclockwise rotation of the pump while isolating the motor from the counterclockwise rotation.

Turning to FIG. 8, shown therein is a depiction of the auto-engageable coupling 114 in a third state. In this third state of operation, the pump 108 is rotating in the first direction (e.g., clockwise), but the motor 110 has not been activated to transmit torque to the pump 108. The pump 108 could be forced into rotation in the clockwise direction while the pump 108 is being run into the wellbore 104, or from the passage of pressurized well fluids through the pump 108 into the production tubing 102 (e.g., during a "well kick"). In this mode of operation, the reaction plate 122 rotates in the clockwise direction without engaging the drive plate 120 or the braking plate 124. In this way, the auto-engageable coupling 114 isolates the torque generated by the passive rotation of the pump 108 from being transmitted to the motor 110. This prevents the motor 110 from generating a back EMF force from the torque produced by the pump 108.

Turning to FIG. 9, shown therein is a depiction of the auto-engageable coupling 114 in a fourth state. In this fourth state of operation, the pump 108 is being driven in the reverse direction (e.g., counterclockwise) by fluid falling through the production tubing 102. This could be caused by an injection operation in which fluid is injected into the production tubing through the wellhead when power is lost or removed from the motor 110, or while pulling the pump 108 out of the wellbore 104. The output shaft 128 drives the reaction plate 122 in the counterclockwise direction, which forces the reaction plate 122 into a locked relationship with the braking plate 124. The braking plate 124 prevents the reaction plate 122 (and drive plate 120) from rotating in the counterclockwise, reverse direction.

Figure 10:
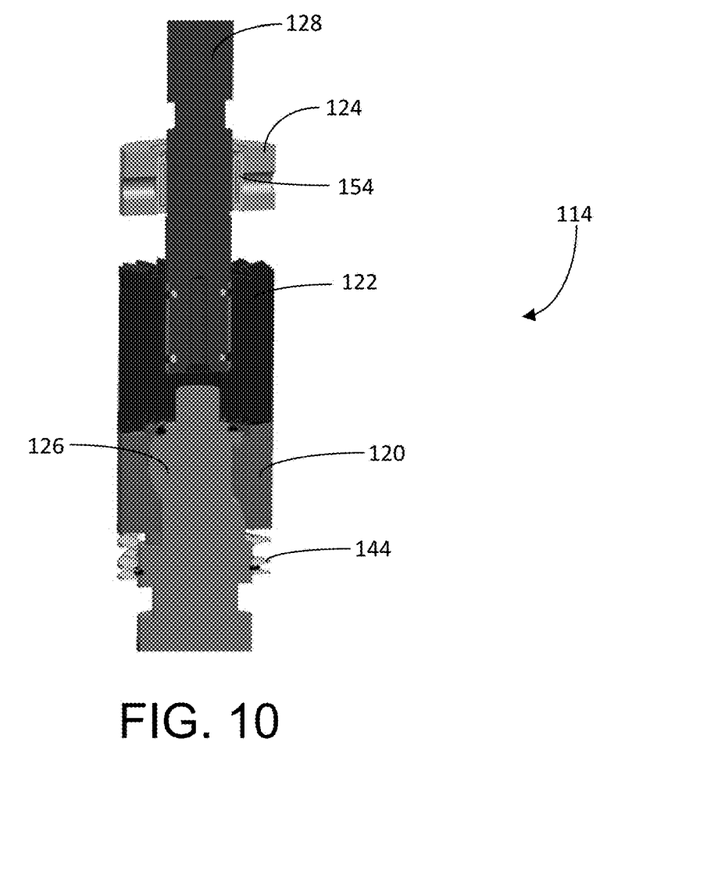
FIG. 10 presents cross-sectional view of an auto-engageable coupling constructed in accordance with a second embodiment.
Figure 11:
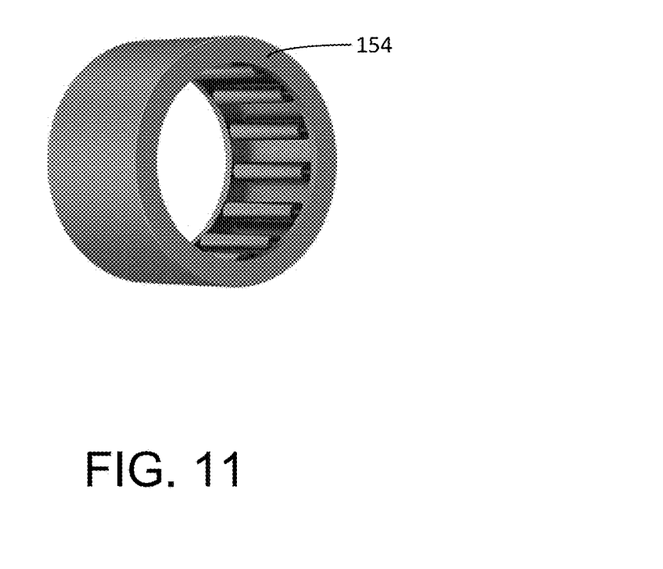
FIG. 11 presents a perspective view of a one-way roller clutch from the auto-engageable coupling of FIG. 10.

Turning to FIG. 10, shown therein is a second embodiment of the auto-engageable coupling 114. In the embodiment depicted in FIG. 10, the braking plate 124 has been replaced by a braking clutch bearing 154. The braking clutch bearing 154 (depicted in FIG. 11) permits the output shaft 128 to rotate in the intended clockwise direction, but applies a braking force to the output shaft 128 when it is rotated in the counterclockwise direction. The one-way braking clutch bearing 154 includes a plurality of captured individual roller bearings (not separately designated) that roll freely in response to the rotation of the output shaft 128 in one direction, but resist rolling when the output shaft 128 is rotated within the braking clutch bearing 154 in the opposite direction.

Figure 12:
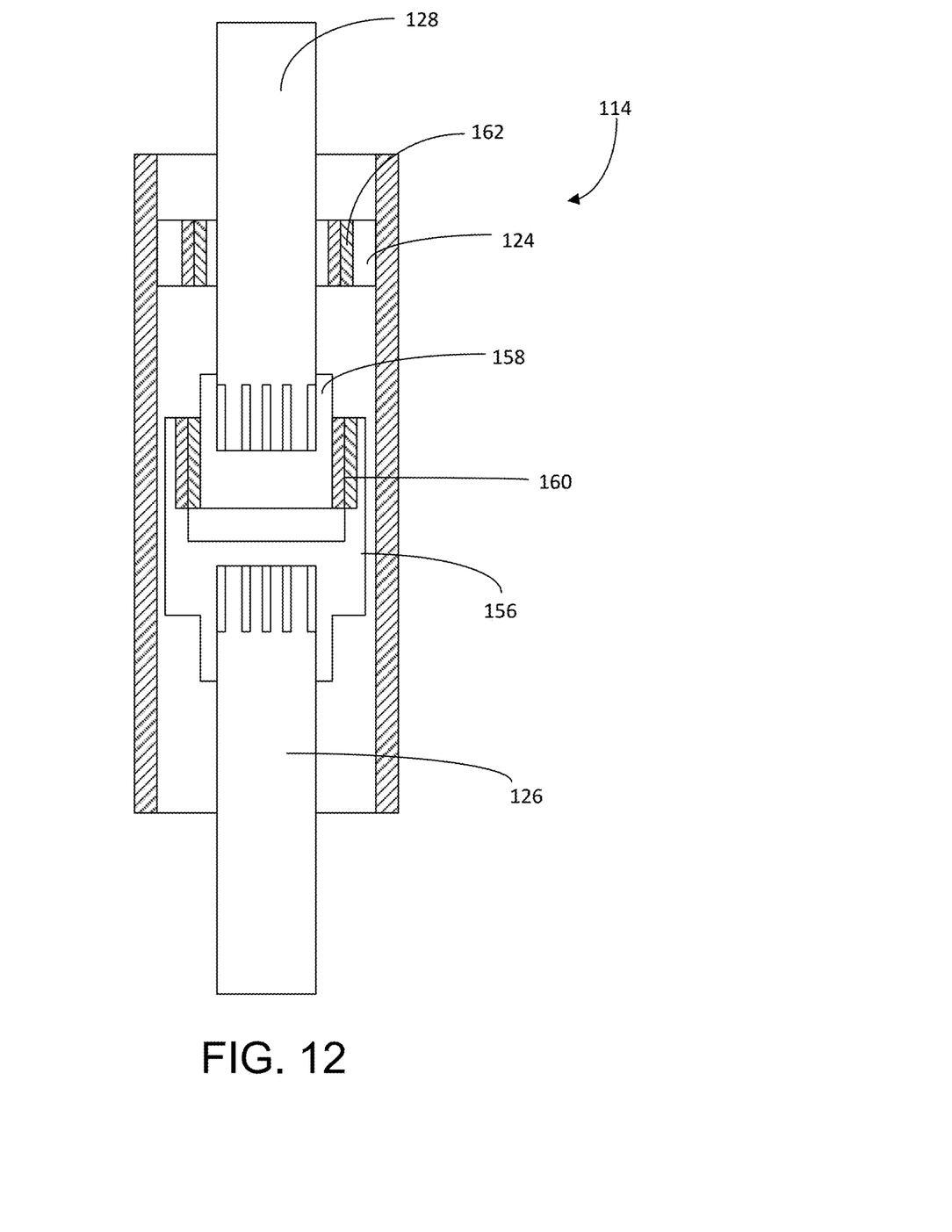
FIG. 12 presents a side view of an auto-engageable coupling constructed in accordance with a third embodiment.

Turning to FIG. 12, shown therein is a third embodiment of the auto-engageable coupling 114. In this third embodiment, the auto-engageable coupling 114 includes a drive cup 156 connected to the motor shaft 126 and an output cup 158 connected to the output shaft 128. The auto-engageable coupling 114 includes a one-way drive bearing clutch 160 between the drive cup 156 and output cup 158. The one-way drive bearing clutch 160 allows rotation between an interior and an exterior component when the interior component is rotated in a first direction, but locks the interior component and exterior component together when rotated in a second, opposite direction. The drive bearing clutch 160 is configured so that intentional rotation of the motor shaft 126 (e.g., in the clockwise direction) is transferred to the output shaft 128 through locking the drive bearing clutch 160, while permitting the rotation of the output shaft 128 in the intended direction. However, when the motor shaft 126 rotates in an unintended direction (e.g., in the counterclockwise direction), the drive bearing clutch 160 is not locked and torque is not transmitted from the motor shaft 126 to the output shaft 128.

In this embodiment, the brake bearing clutch 162 is configured to discourage the rotation of the output shaft 128 in a counterclockwise direction. Accordingly, if the pump 108 induces a counterclockwise rotation in the output shaft 128, the brake bearing clutch 162 locks the output shaft 128 against the braking plate 124 or other stationary component within the auto-engageable coupling 114.

Figure 13A:
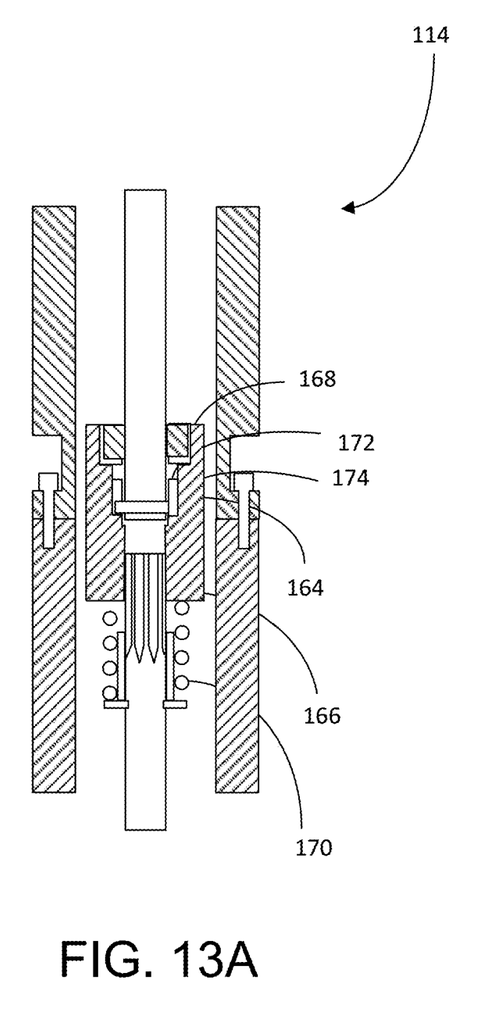
FIG. 13A presents a cross-sectional view of an auto-engageable coupling constructed in accordance with a fourth embodiment in an engaged position.
Figure 13B:
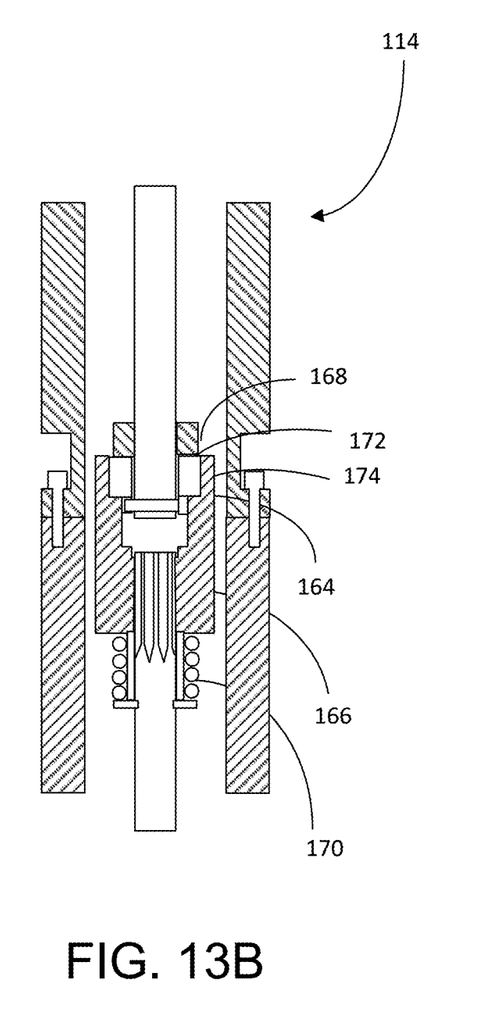
FIG. 13B presents a cross-sectional view of an auto-engageable coupling constructed in accordance with a fourth embodiment in a disengaged position.

Turning to FIGS. 13A and 13B, shown therein is a fourth embodiment of the auto-engageable coupling 114. In the embodiment depicted in FIGS. 13A and 13B, the auto-engageable coupling 114 includes a central coupling 164 that includes input splines 166 for receiving the motor shaft 126 and output splines 168 for receiving the output shaft 128. A drive spring 170 located on the motor shaft 126 is configured to apply an upward force against the central coupling 164. The central coupling 164 further includes helical grooves 172 that are configured to accept a shaft pin 174 at the end of the output shaft 128.

During normal operation, the central coupling 164 remains in the deployed ("engaged") position in which the output shaft 128 is engaged with the output splines 168 of the central coupling 164, as depicted in FIG. 13A. If, however, the output shaft 128 is forced into rotation in a reverse direction, the engagement between the shaft pin 174 and the helical grooves 172 forces the central coupling 16 into a retracted position ("disengaged") against the compressive force applied by the drive spring 170, as depicted in FIG. 13B.

Figure 14:
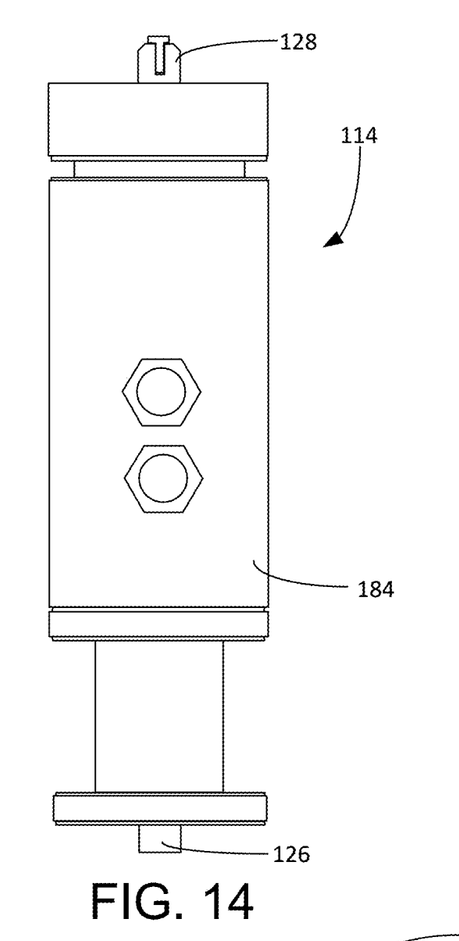
FIG. 14 presents a side view of an auto-engageable coupling constructed in accordance with a fifth embodiment.
Figure 15:
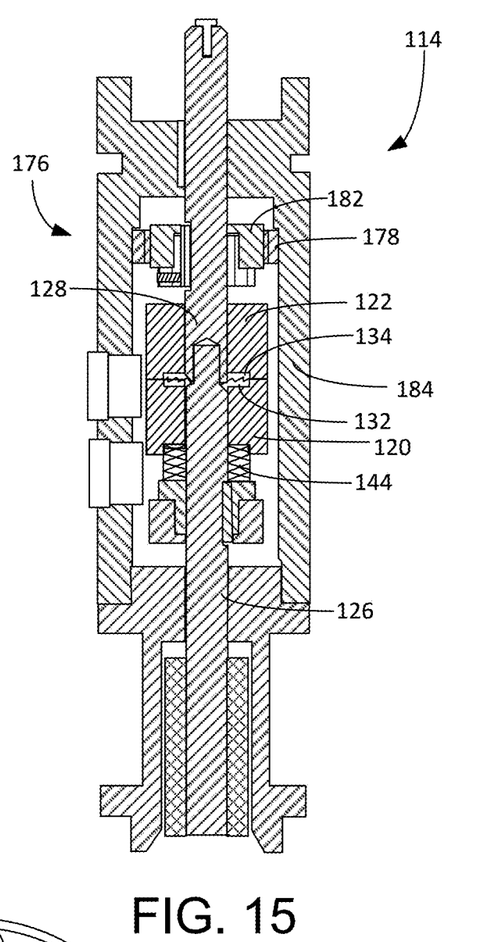
FIG. 15 presents a cross-sectional view of the auto-engageable coupling of FIG. 14.
Figure 16:
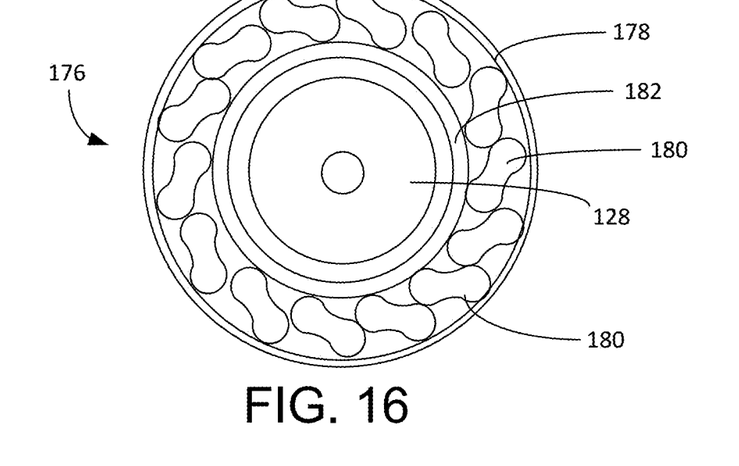
FIG. 16 presents a plan view of the sprag clutch assembly of the auto-engageable coupling of FIG. 15.

Turning to FIGS. 14-16, shown therein are depictions of a fifth embodiment of the auto-engageable coupling 114 in which the braking plate 124 or one-way clutch bearing 154 has been replaced by a sprag bearing assembly 176. The sprag bearing assembly 176 includes a sprag bearing cage 178 that is contained within the housing 184 of the auto-engageable coupling 114, which can be integrated within the motor 110, pump 108 or seal section 112, or presented as a standalone component within the pumping system 100. The sprag bearing cage 178 includes a plurality of directionally oriented tooth-like sprag members 180 (depicted in FIG. 16). The sprag bearing assembly 176 further includes a runner 182 that is connected for rotation with the output shaft 128.

In this embodiment, the motor shaft 126 is connected to the drive plate 120, which engages with the reaction plate 122 as previously disclosed. The output shaft 128 is connected to the runner 182, which rotates with the output shaft 128 within the sprag bearing assembly 176 when the output shaft 128 is rotated in the intended, motor-driven direction. If the output shaft 128 is caused to rotate in the unintended direction, either by the pump 108 or the motor 110, the rotation of the runner 182 is resisted by the sprag bearing assembly 176.

Thus, in each embodiment, the auto-engageable coupling 114 includes a drive plate 120 coupled to the motor shaft 126 and a reaction plate 122 coupled to the output shaft 128, which is selectively coupled to the motor shaft 126 when the motor shaft 126 is rotated in the intended direction. When the motor shaft 126 is rotated in an unintended direction, the reaction plate 122 and drive plate 120 do not engage and torque is not transferred to the output shaft 128. The output shaft 128 is also coupled to a directional braking mechanism, which resists the rotation of the output shaft 128 in an unintended direction. As used herein, the term "braking mechanism" includes, but is not limited to, to the braking plate 124, the one-way clutch bearing 154, the brake bearing clutch 162, or the sprag clutch assembly 176. In each embodiment, the auto-engageable coupling 114 can be filled with liquid lubricants to ensure the long-lasting performance of the auto-engageable coupling 114.

This written description uses examples to disclose the claimed subject matter, including the best mode, and also to enable any person skilled in the art to practice the subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An auto-engageable coupling for use in connection with a submersible pumping system that includes a pump and a motor, the auto-engageable coupling comprising:
 a drive plate connected directly to a motor shaft driven by the motor, wherein the drive plate includes drive plate teeth;
 a reaction plate connected directly to an output shaft, wherein the reaction plate includes reaction plate lower teeth that are configured to engage the drive plate teeth when the drive plate is rotated in an intended direction by the motor shaft to permit the transmission of torque from the motor to the pump when the motor is energized for rotation in the intended direction;
 a braking mechanism, wherein the braking mechanism is configured to resist the rotation of the output shaft in an unintended direction; and
 wherein the drive plate and reaction plate prevent the transmission of torque from the pump to the motor when the motor is not energized for rotation.

2. The auto-engageable coupling of claim 1, further comprising a lower spring configured to press the drive plate into proximity with the reaction plate.

3. The auto-engageable coupling of claim 2, further comprising a torque displacement mechanism that is configured to force the drive plate into a locked engagement with the reaction plate when torque is applied to the drive plate.

4. The auto-engageable coupling of claim 3, wherein the torque displacement mechanism comprises spiraled gears on the motor shaft and interior slots within the drive plate that engage with the spiraled gears on the motor shaft.

5. The auto-engageable coupling of claim 1, wherein the braking mechanism comprises a braking plate.

6. The auto-engageable coupling of claim 5, wherein the braking plate comprises braking plate teeth, and wherein the reaction plate comprises reaction plate upper teeth, and wherein the reaction plate upper teeth are configured to engage with the braking plate teeth with the output shaft rotates in the unintended direction.

7. The auto-engageable coupling of claim 5, wherein the braking plate includes guide pin slots that accept one or more guide pins that prevent the braking plate from rotating.

8. The auto-engageable coupling of claim 5, further comprising an upper spring configured to press the braking plate into proximity with the reaction plate.

9. The auto-engageable coupling of claim 1, wherein the braking mechanism comprises a one-way clutch bearing.

10. The auto-engageable coupling of claim 1, wherein the braking mechanism comprises a sprag bearing assembly that comprises:
 a sprag bearing cage;
 a plurality of sprag members within the sprag bearing cage; and
 a runner connected to the output shaft.

11. The auto-engageable coupling of claim 1, wherein the output shaft is a pump shaft that extends into the pump.

12. The auto-engageable coupling of claim 1, wherein the submersible pumping system further comprises a seal section between the pump and motor, and wherein the output shaft is a seal section shaft that extends into the seal section.

* * * * *